United States Patent [19]

Bennie et al.

[11] Patent Number: 4,785,976
[45] Date of Patent: Nov. 22, 1988

[54] DISPENSER FOR FLUENT MATERIALS

[76] Inventors: John E. Bennie, Wembly Farm; Kevin N. A. Cockburn, Dean's Farm, both of Greytown, Natal, South Africa

[21] Appl. No.: 85,838

[22] Filed: Aug. 17, 1987

Related U.S. Application Data

[63] Continuation-in-part of Ser. No. 774,825, Sep. 11, 1985, abandoned.

[30] Foreign Application Priority Data

Sep. 17, 1984 [ZA] South Africa .................. 84/7304

[51] Int. Cl.⁴ .................. G01F 11/10; B05B 1/14; A01C 17/00
[52] U.S. Cl. .................. 222/370; 239/555; 239/563; 239/581.1; 239/665
[58] Field of Search .............. 239/379, 446, 447, 555, 239/562, 563, 581.1, 665, 451, 455; 222/370, 486

[56] References Cited

U.S. PATENT DOCUMENTS

| 966,564 | 8/1910 | Koegler | 222/486 |
|---|---|---|---|
| 2,207,822 | 7/1940 | Rooney et al. | 222/370 |
| 2,944,707 | 7/1960 | Steinmetz | 222/370 X |
| 3,195,776 | 7/1965 | Helm et al. | 222/370 X |
| 4,609,153 | 9/1986 | van der Lely | 239/665 |

FOREIGN PATENT DOCUMENTS

| 2444285 | 4/1976 | Fed. Rep. of Germany . |
| 2731798 | 1/1979 | Fed. Rep. of Germany . |
| 1097241 | 7/1955 | France . |

Primary Examiner—Andres Kashnikow
Assistant Examiner—Mary Beth O. Jones
Attorney, Agent, or Firm—Pennie & Edmonds

[57] ABSTRACT

An improved dispenser for granular materials is disclosed, comprising upper and lower fixed plates and a rotating intermediate plate. The upper and lower plates have orifices formed in them which are out of register with one another. The relative extent of these orifices is chosen in accordance with the material to be dispensed such that the material only flows through the plates when the intermediate plate is rotating.

7 Claims, 3 Drawing Sheets

FIG. 1
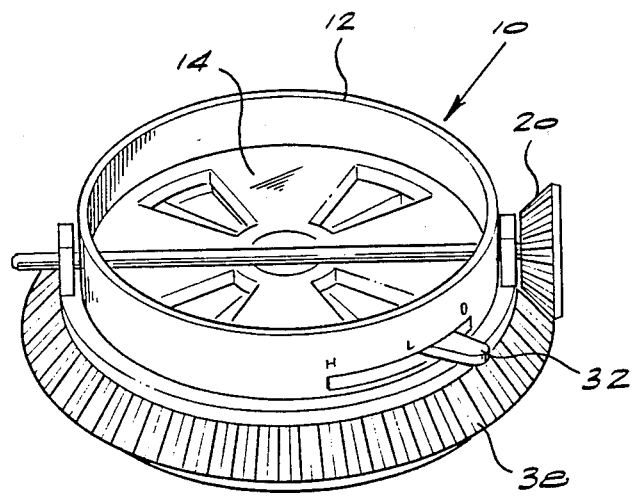
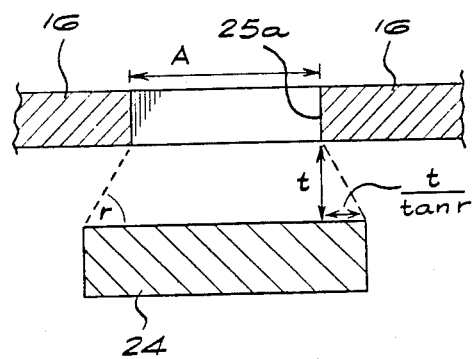
FIG. 4

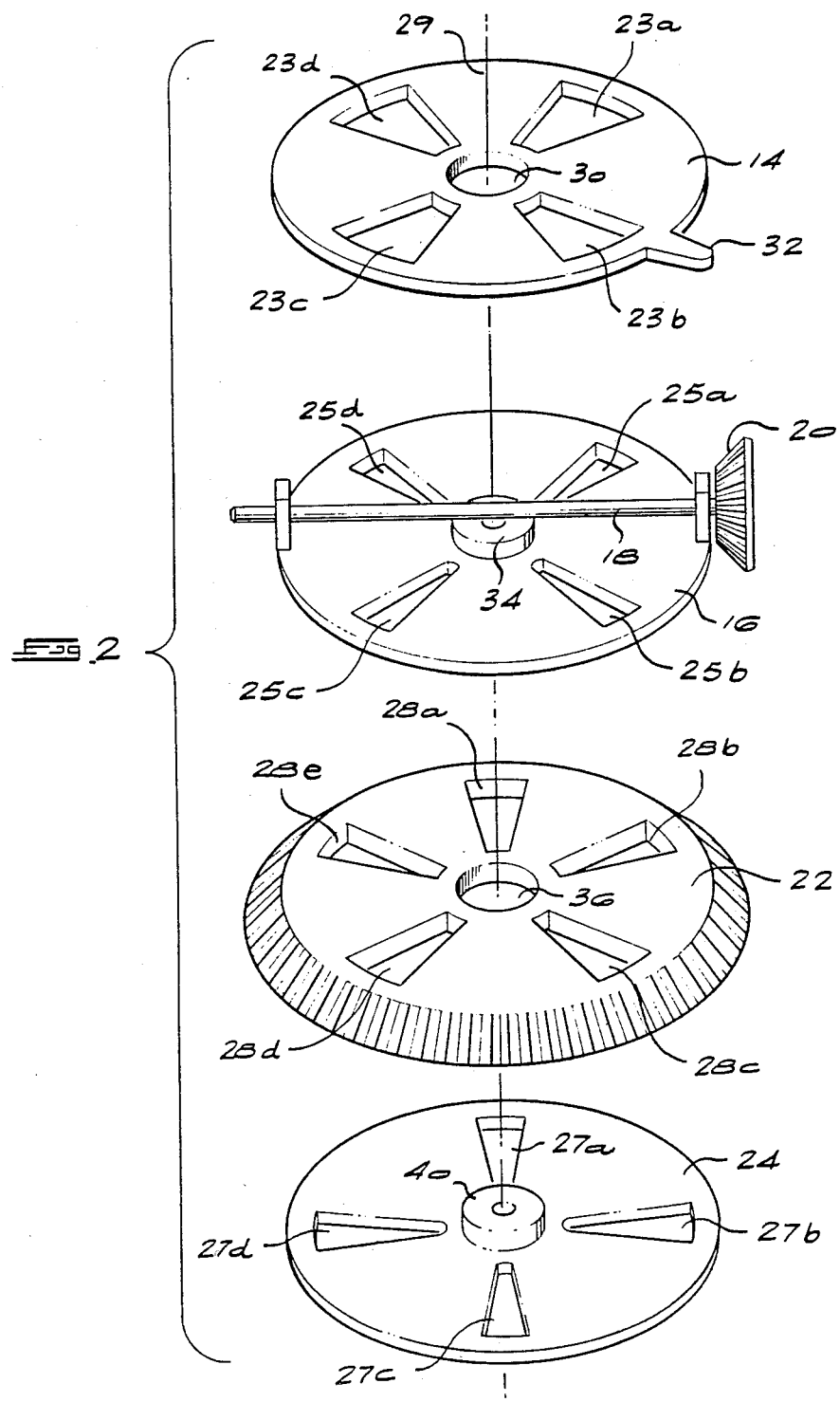

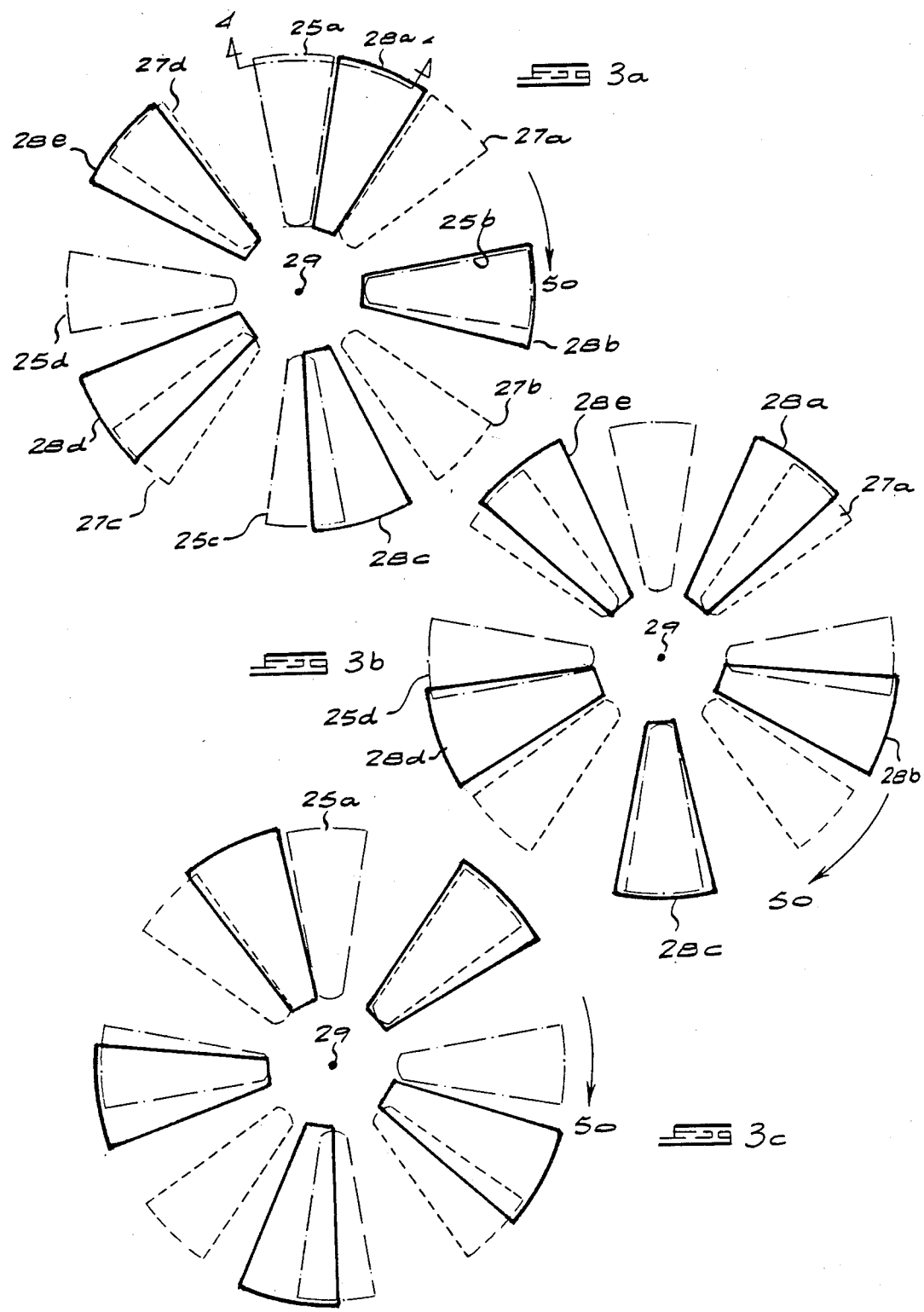

DISPENSER FOR FLUENT MATERIALS

RELATED APPLICATION

This application is a continuation-in-part of application Ser. No. 774,825 filed by the applicants on 11 Sept. 1985, now abandoned.

FIELD OF THE INVENTION

This invention relates to a dispenser for fluent materials and in particular for granular material, powders or other fluent solid compositions.

BACKGROUND OF THE INVENTION

A number of dispensers have been proposed to distribute particulate material such as fertiliser as the device containing the dispenser is moved. Usually a wheel of the device causes relative rotation of plates at the outlet of the hopper for the material, the plates having orifices which are in and out of register as rotation occurs, thereby allowing a controlled amount of the material to be dropped.

German Pat. No. 2 444 285 (WOLLNER) relates to a silo outlet having a plate having orifices in direct communication with the material in the hopper. The material drops through the orifices on to a second plate spaced away from the first plate and a wiper blade causes the material deposited on the lower plate to be transferred to a central opening through which it drops by gravity. In this way a predetermined measured amount of the material can be delivered.

In German Pat. No. 2 731 798 (CHAMBON) a series of three plates is provided. These are movable relatively to one another, the arrangement being such that the orifices of the first plate register with those of the second plate when the latter are out of register with the orifices of the third (or lowermost) plate. Thus, the orifices in the second plate become full and further relative movement brings the orifice of the second plate into register with those of the third plate, the material falling through the latter orifices. Thus, an intermittent discharge of the material is obtained and while this may be satisfactory for certain purposes, it is not entirely satisfactory for all purposes.

Another patent which describes a dispenser which dispenses fluent material in an intermittent fashion is U.S. Pat. No. 2,207,822 (ROONEY et al). In this patent, there is an upper plate, an intermediate plate and a lower plate which is fixed with reference to the upper plate. The intermediate plate is rotatable relative to the upper and lower plates. Both the upper and lower plates have a single orifice while the intermediate plate has a plurality of orifices. During rotation of the intermediate plate, its orifices receive material in turn from the single orifice of the upper plate and then subsequently discharge that material in intermittent fashion as each of its orifices in turn registers with the single orifice in the lower plate. The material dropping through the lower plate falls into a vertical pipe feeding into a horizontal chute along which air is forced by a fan. The action of the fan is to spread the material.

In the case of a dispenser intended to dispense granular material such as fertilizer it is clearly undesirable to have an intermittent flow as would result from the Rooney apparatus in the absence of its fan. By the same token, the provision of a fan involves extra complications and expense.

It is the object of the present invention to provide a dispenser for granular and other fluent materials which has an assembly of upper and lower plates and a rotatable intermediate member, the dispenser operating in such a manner that there is a continuous, and not intermittent, dispensing of material through the lower plate.

SUMMARY OF THE INVENTION

The present invention provides a continuous flow dispenser for fluent materials, the dispenser comprising:

(a) a first, upper plate having a central axis and a plurality of first orifices communicating in use with a hopper containing fluent material which is to be dispensed, the first orifices being spaced angularly apart about the central axis;

(b) a second, lower plate which is fixed with respect to the first plate and which has a central axis coincident with the central axis of the first plate and which is formed with a plurality of second orifices spaced angularly apart about the central axis, the second orifices being out of register with the first orifices; and (c) an intermediate member which is rotatable relative to the first and second plates about a central axis which is coincident with the central axis of the first and second plates and which is formed with a plurality of third orifices spaced angularly apart about the central axis, the number of third orifices being different from the number of first orifices and the number of second orifices and being neither a multiple nor a factor of the number of first orifices or the number of second orifices;

the arrangement of the orifices being such that relative rotation of the intermediate member relative to the first and second plates causes the third orifices to move into and out of register with the first orifices and the second orifices so as to receive material from the first orifices and to dispense that material through the second orifices, and furthermore being such that, at all times during such relative rotation in operation of the dispenser, material flow through the second plate is continuous.

In a preferred version of the invention, the first and second plates have an equal number of orifices and the intermediate member has one more orifice than the plates. In a particularly preferred embodiment the first and second plates each have four orifices and the intermediate member has five orifices.

In one design, the first and second orifices are all identical and sector-shaped, the third orifices are also sector-shaped and identical to one another and the circumferential extent of each third orifice at its radially outer limit is greater than that of each first or second orifice.

BRIEF DESCRIPTION OF THE DRAWINGS

An embodiment of the invention will now be described with reference to the accompanying drawing in which:

FIG. 1 shows a perspective view of an assembled dispenser of the present invention;

FIG. 2 shows the dispenser of FIG. 1 in an exploded state;

FIG. 3 illustrates, in diagrammatic fashion, the operation of the dispenser; and FIG. 4 shows a partial cross-section at the line 4—4 in FIG. 3a.

DESCRIPTION OF THE PREFERRED EMBODIMENT

Referring to the drawings a dispenser 10 has a ring 12 which forms part of a hopper (not seen in the drawings) for fluent material such as fertiliser in granular form. The dispenser 10 is an assembly of successive plates which comprise a cut off or regulating plate 14, a first stationary plate 16 to which is fixed a shaft 18 having a bevel gear 20 at one end, a rotating intermediate member 22, and a second fixed plate 24.

The plate 14 has four sector-shaped cut-outs 23a, 23b, 23c and 23d. The plate 16 also has four sector-shaped cut-outs 25a, 25b, 25c and 25d. Similarly, the plate 24 has four sector-shaped cut-outs 27a, 27b, 27c and 27d. The intermediate member 22 has five sector-shaped cut-outs 28a, 28b, 28c, 28d and 28e. The three plates and the intermediate member have a common central axis 29.

In an alternative form of the invention (not seen in the drawings) the shaft 18 may be located in the throat of the hopper separate from the top plate and journalled by suitable bearings.

The cut off plate 14 has a central aperture 30 and a radial projection 32 by means of which it can be rotated relatively to the first plate 16 in order to arrange complete, partial or no obturation of the openings 25a–25d of the plate 16 depending on the rate desired of discharge of the fluent material. The ring 12 is marked with H (for high delivery), L (for low delivery) and 0 (for zero delivery). A boss 34 fixed centrally to the first stationary plate 16 passes through the aperture 30 of the cut off plate 14.

The rotating intermediate member 22 has a central aperture 36 and the peripheral circumferential edge of the member has bevel gear teeth 38. The aperture 36 receives a central boss 40 fixed on the plate 24.

The bevel gear teeth 38 mesh with the bevel gear 20 mounted on the stationary plate 16. An axial bolt (not seen in the drawings) holds the assembly of plates together during operation.

When the dispenser is fitted to a hopper of granular fertiliser or other fluent material, the orifices 23a to 23d are filled under gravity with the material. Assuming that the plate 14 is arranged at some position other than the zero delivery position, the orifices 25a to 25d will be at least partially in register with the orifices 23a to 23d and will, as a result, also be filled with the material from the hopper. The shaft 18 is connected to some motive source. In the case of a dispenser for fertiliser, the motive source will typically be a ground-engaging wheel of a vehicle which is transportable over a field which is to be fertilised.

Rotation of the shaft 18 results in rotation of the intermediate member 22 at a speed dependent on the speed of rotation of shaft 18. In the case of a shaft 18 rotated by a ground-engaging wheel, the speed of rotation of the intermediate member 22 is dependent on the speed at which the ground-engaging wheel turns, i.e. on the speed at which the vehicle is drawn over the field.

As the member 22 rotates, its orifices 28a to 28e move into and out of register with the orifices 25a to 25d of the plate 16, and receive material from those orifices. Also, the rotation of the intermediate member 22 brings its orifices 28a to 28e into and out of register with the orifices 27a to 27d of the plate 24, with the result that material is discharged under gravity through the latter orifices.

It is clearly most important that the orifices in the plates 16 and 24, which are fixed relative to one another, should not be in register. If they or any of them were in register, material would be able to drop directly through the plate 24 each time an orifice 28a to 28e came into register, resulting in an uneven spread.

FIGS. 3a to 3c show the plates 16 and 24 and the intermediate member 22 in a plan view in superimposed relationship, with the orifices of the plate 16 illustrated by means of a chain-dot line, with the orifices of the plate 24 illustrated by means of a chain line, and with the orifices of the member 22 illustrated by means of solid, thick lines.

Reference to any one of these figures indicates that the orifices 25a to 25d are totally out of register with the orifices 27a to 27d. In this embodiment, the orifices of the one plate are angularly space by 45° from the orifices of the other plate.

For continuous operation, i.e. continuous dispensing of fluent material through the plate 24, it is also important that the number of orifices in the intermediate member be different from the number of orifices in the plate 16 or the plate 24, and that it be neither a factor nor a multiple of the number of orifices in the plate 16 or the plate 24. The illustrated case is a 4:5:4 dispenser, that is there are four orifices in the plate 16, four in the plate 24 and five in the member 22.

Intermittent flow will result if, for instance, the number of orifices in the member 22 is a factor of the number of orifices in either the plate 16 or the plate 24. For example with a 4:2:4 arrangement, the two orifices of the member 22 will be filled from the first two orifices of the plate 16 that they pass under and will discharge through the first two orifices in the plate 24 that they pass over. There will then be a delay before further material is able to drop through the orifices of the plate 24.

Intermittent flow will clearly also result if, for instance, the number of orifices in the member 22 is a multiple of the number of orifices in either the plate 16 or the plate 24. This kind of situation is illustrated in the ROONEY et al patent referred to earlier.

In the preferred, illustrated arrangement, there are equal numbers of orifices in the plate 16 and 24 and one more orifice in the intermediate member.

FIG. 3a shows the orifice 28a at a location in which it registers with no orifice in the plate 16 or the plate 24. The orifice 28a will be full of material by virtue of its prior passage beneath the orifice 25a of the plate 16. Further rotation of the member 22 in the direction of the arrow 50 to the FIG. 3b position brings the orifice 28a partially into register with the orifice 27a in the plate 24, with the result that material is able to drop through that plate onto, in the case of fertiliser, the ground. At this stage, the orifice 28d has just moved into register with the orifice 25d and is filling with material from the orifice. The orifice 28b has filled while the orifice 28c is filling, the orifice 28a is emptying and the orifice 28e has already emptied.

FIG. 3c shows the situation after a further, small increment of rotation in the direction of the arrow 50. Here, the orifice 28a has completely emptied, the orifice 28b is starting to empty, the orifice 28c is filling, the orifice 28d has filled, and the orifice 28e has finished emptying just prior to refilling through the orifice 25a.

It will be appreciated that at any moment during the rotation of the member 22 (assuming that the plate 14 permits flow to the plate 16 to take place), material is being discharged through the plate 24. Thus there is continuous flow during operation which is in complete contrast to the prior art device proposed by ROONEY.

The orifices 28a to 28e are slightly larger in the circumferential direction than the orifices 25a to 25d and 27a to 27d, which have the same size.

FIG. 4 shows a schematic cross-section at the line 4—4 in FIG. 3a with the intermediate member 22 left out. The dimension A represents the circumferential extent of the orifice 25a at its radially outer limit, the dimension t represents the thickness of the intermediate member 22 and the angle r is the angle of repose of granular material, such as granular fertiliser, which is being dispensed and which has a mean particle size of F. The fact that all granular materials have a natural angle of repose affects the maximum value of the dimension A. As illustrated by FIG. 4, the width of the solid portion of the lower plate opposed to each of the orifices 25a–25d in the upper plate must exceed the dimension A by at least a quantity 2t/tan r. In this way, the granular material cannot move down the slope defined by the angle of repose r to escape through orifices 28a-28e except when the intermediate plate is rotating. The material is thereby prevented from flowing directly through the orifices in the upper, intermediate, and lower plates and is properly metered by the intermediate plate of the dispenser.

The angle of repose of the material being dispensed and the mean particle size have been taken into account by the inventors in arriving empirically at the following formula defining upper and lower limits for the dimension A in the preferred arrangement:

$$\left(\frac{C}{h} - \frac{C}{H}\right)\left(\frac{1}{H-h}\right) + F \leq A \leq \left(\frac{C}{2h} - \frac{t}{\tan r}\right) \quad (1)$$

where C is the circumference of a circle passing through the radially outer limits of the orifices, H is the number of orifices in the member 22 and h is the number of orifices in the plates 16 and 24.

Other preferred relationships are the following:

$$H < \frac{C}{A} \quad (2)$$

(3) a>F, where a is the circumferential extent of an orifice 25, 27 or 28 at the radially inner limits of such orifices.

The inventors have tested a number of fertiliser dispensers conforming to the above relationships and have found that they operate well in practice, depositing the fertiliser continuously onto the ground uniformly enough for practical purposes.

What is claimed is:

1. A continuous flow dispenser for granular fluent materials, the dispenser comprising:
  a. a first, upper plate having a central axis and a plurality of substantially similar first orifices disposed about said axis and communicating in use with a hopper containing fluent material which is to be dispensed, the first orifices being spaced angularly apart at equal circumferential intervals about the central axis;
  b. a second, lower plate which is fixed with respect to the first plate and which has a central axis coincident with the central axis of the first plate and which is formed with a plurality of substantially similar second orifices spaced angularly apart at equal circumferential intervals about the central axis, the second orifices being circumferentially out of register with the first orifices so that each of the orifices in the upper plate is opposed by a solid portion of the lower plate; and
  c. an intermediate member which is disposed between and rotatable relative to the first and second plates about a central axis which is coincident with the central axis of the first and second plates and which is formed with a plurality of substantially similar third orifices spaced at equal circumferential intervals apart about the central axis, the number of third orifices being different from the number of first orifices and the number of second orifices and being neither a multiple nor a factor of the number of first orifices or the number of second orifices;

the arrangement of the orifices being such that relative rotation of the intermediate member relative to the first and second plates causes the third orifices to move into and out of register with the first orifices and the second orifices so as to receive material from the first orifices and to dispense that material through the second orifices, and wherein the circumferential extent of the orifices in the plates and in the intermediate member is chosen with respect to the particular granular material to be dispensed such that the circumferential extent of each of the orifices in the upper plate is less than that of the opposed solid portions of the lower plate by an amount at least equal to the quantity 2t/tan r, wherein t is the spacing of the fixed plates and r is the angle of repose of the granular material to be dispensed, whereby direct flow of the material from the hopper through the first upper plate, the intermediate member and the lower plate is avoided, and whereby at all times during such relative rotation of said intermediate member in operation of the dispenser, material flow through the second plate is substantially continuous.

2. A dispenser according to claim 1 wherein the first and second plates have an equal number of orifices and the intermediate member has one more orifice than the first plate or the second plate.

3. A dispenser according to claim 2 wherein the first and second plates each have four orifices and the intermediate member has five orifices.

4. A dispenser according to claim 1 wherein:
  (a) the first and second orifices are identical to one another and are sector-shaped;
  (b) the third orifices are identical to one another and are sector-shaped; and
  (c) the circumferential extent of each third orifice at its radially outer limit is greater than the circumferential extent of each first or second orifice at its radially outer limit.

5. A dispenser according to claim 4 wherein:

$$\left(\frac{C}{h} - \frac{C}{H}\right)\left(\frac{1}{H-h}\right) + F \leq A \leq \left(\frac{C}{2h} - \frac{t}{\tan r}\right),$$

where
A = the circumferential extent of a first or second orifice at the radially outer limit of the orifice
C = the circumference of a circle passing through the outer limits of the first and second orifices H = the number of third orifices
h = the number of second orifices
h = the number of first orifices
F = the mean particle size of granules which are to be dispensed
r = the natural angle of repose of granular material which is to be dispensed.

6. A dispenser according to claim 5 wherein:

$$H < \frac{C}{A}$$

7. A dispenser according to claim 5 wherein:
a>F, a being the circumferential extent of a first, second or third orifice at the radially inner limit of the orifice.

* * * * *